(12) United States Patent
Miyamoto et al.

(10) Patent No.: US 6,478,309 B1
(45) Date of Patent: Nov. 12, 2002

(54) CONSTANT VELOCITY JOINT BOOT

(75) Inventors: Kenji Miyamoto, Nakashima-gun (JP); Yuji Furuta, Ama-gun (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/640,911

(22) Filed: Aug. 18, 2000

(30) Foreign Application Priority Data

Aug. 26, 1999 (JP) ............................................. 11-239408

(51) Int. Cl.$^7$ .............................. F16J 15/52; F16C 1/26; F16L 21/00; F16L 51/02
(52) U.S. Cl. ........................ 277/634; 277/635; 277/636; 464/175; 285/226
(58) Field of Search ................................ 277/634, 635, 277/636; 464/175; 285/226; 92/34

(56) References Cited

U.S. PATENT DOCUMENTS

| 4,730,834 A | * | 3/1988 | Ukai et al. | |
| 4,735,596 A | * | 4/1988 | Ukai et al. | |
| 4,844,486 A | | 7/1989 | Schiemann | |
| 4,923,432 A | * | 5/1990 | Porter | |
| 5,722,669 A | | 3/1998 | Minoru et al. | |
| 5,879,238 A | * | 3/1999 | Breheret | 277/636 |
| 6,089,574 A | * | 7/2000 | Sadr et al. | 277/635 |
| 6,099,788 A | * | 8/2000 | Sadr et al. | 156/73.5 |

FOREIGN PATENT DOCUMENTS

| JP | 10-299788 | 11/1998 |
| JP | 10-299789 | 11/1998 |

* cited by examiner

*Primary Examiner*—Anthony Knight
*Assistant Examiner*—Vishal Patel
(74) *Attorney, Agent, or Firm*—Pillsbury Winthrop LLP

(57) ABSTRACT

A constant velocity joint boot includes a bellowed portion and the first crest portion of the bellowed portion is formed to have the same outer diameter as the first cylindrical portion, and the length of the membrane extending from the first crest portion through the second root portion to the second crest portion is set to be almost the same as that extending from the second crest portion through the third root portion to the third crest portion, and the depth of the second root portion h and the depth of the third root portion H satisfy a relational expression $H/1.3 \leq h \leq H/1.1$.

7 Claims, 4 Drawing Sheets

CENTER AXIS

CENTER AXIS

NOT SUFFICIENT IN LENGTH OF MEMBRANE

CONSTANT VELOCITY JOINT BOOT

BACKGROUND OF THE INVENTION

1. Field of the Invention

The present invention relates to a boot covering a constant velocity joint that is indispensably used for a joint of a drive shaft used in a front drive vehicle in order to prevent water or dust from entering into a joint portion of the constant velocity joint.

The present application is based on Japanese Patent Application No. Hei. 11-239408, which is incorporated herein by reference.

2. Description of the Related Art

Conventionally, in a joint portion of a constant velocity joint, a smooth revolution at a large angle is maintained by being covered by a bellowed boot to prevent water and dust from entering therein. The constant velocity joint boot comprises a first cylindrical portion of a large diameter being held by a joint outer race or the like, a second cylindrical portion of a smaller diameter than the first cylindrical portion and being held by a shaft, and a bellowed portion in the shape of a generally truncated triangular pyramid for integrally connecting the first cylindrical portion and the second cylindrical portion. When in use, since a bellowed portion deforms with angle variations between the joint outer race or the like and the shaft, the joint portion may be reliably sealed by the boot even when the angle is significantly large.

The bellowed portion of the conventional boot constant velocity joint is formed with crests and roots continuing alternately and respective crests and roots are generally formed in geometrical similarity.

In a conventional constant velocity joint boot, the outer diameters of the crest portions are relatively large in order to grease the way to accommodate variations in the angle defined between the central axis of a joint outer race or the like and the central axis of a shaft and reduce stresses generated at the bellowed portion. However, in recent years, as weight reduction of vehicles has been asked for, miniaturization of the constant velocity joint boots is also asked for in conjunction with miniaturization of vehicles.

Miniaturization of constant velocity joints boots inevitably requires decrease in outer diameter of the bellowed portion. Since reduction of outer diameter of the bellowed portion shortens the length of membrane forming crest portion correspondingly, it is required to increase the depth of the root portions in order to maintain the amount of displacement of the bellowed portion and stresses generated thereby as they were before miniaturization. However, as shown in FIG. 5, simply increasing the depth of the root portion may result in that the second root portion 12 may be jammed between the inboard joint outer race 100 and the shaft 101 when the angle defined by the central axis of the inboard joint outer race 100 or the like and the central axis of the shaft 101 increases. When the root portion is jammed in such a manner, a strong force is applied on the root portion, which may damage the root portion and thus impair the sealing property thereof. Therefore, the boot has to be replaced often, which turns into problem of short life.

SUMMARY OF THE INVENTION

In view of above described circumstances, it is an object of the present invention to present a constant velocity joint boot in which a jam of the root portion may be prevented even when the angle between a pair of axes of rotation defined by a joint outer race or the like and a shaft is significantly large and the dimensions thereof are reduced.

The constant velocity joint boot of the present invention for solving above described problem comprises a first cylindrical portion, a second cylindrical portion being spaced from and coaxial to the first cylindrical portion and having a smaller diameter than the first cylindrical portion, a bellowed portion having a shape of generally truncated triangular pyramid for integrally connecting the first cylindrical portion and the second cylindrical portion, characterized in that the bellowed portion comprises a plurality of crest portions and root portions arranged in such a manner as, from the side of the first cylindrical portion, a first root portion, a first crest portion, a second root portion, a second crest portion, a third root portion, a third crest portion, etc, continuously and alternately, that the outer diameter of the first crest portion is almost the same as that of the first cylindrical portion, and that in the cross section taken through a plane including the central axis, the length of the line connecting the top of the first crest portion through the second root portion to the top of the second crest portion is almost the same as that of the line connecting the top of the second crest portion through the third root portion to the top of the third crest portion, and that the depth of the second root portion (h) and the depth of the third root portion (H) satisfy the relational expression $H/1.3 \leq h \leq H/1.1$.

In the constant velocity joint boot of the present invention, the bellowed portion comprises a plurality of crest portions and root portions arranged in such a manner as, from the side of the first cylindrical portion, a first root portion, a first crest portion, a second root portion, a second crest portion, a third root portion, etc, continuously and alternately, and the outer diameter of the first crest portion is almost the same as that of the first cylindrical portion. The outer diameter of the crest portions become smaller gradually from the second crest portion on, forming a shape of generally truncated triangular pyramid. Therefore, in the constant velocity joint boot of the present invention, since a line connecting the top of each crest portion is an almost straight line and the outer diameter of each crest portion of the bellowed portion is smaller than that of the first cylindrical portion, it is very much miniaturized in size.

In the constant velocity joint boot of the present invention, in the cross section taken through a plane including the central axis, the length of the line connecting the top of the first crest portion through the second root portion to the second crest portion is almost the same as that of the line connecting the top of the second crest portion through the third root portion to the top of the third crest portion. In other words, the length of the membrane extending between the first crest portion and the second crest portion is almost the same as that extending between the second crest portion and the third crest portion. Therefore, a sufficient amount of deformation may be ensured within the range from the first crest portion through the second root portion, the second crest portion, the third root portion, and the third crest portion where a large amount of deformation is expected as a constant velocity joint boot. It is also preferable to make the length of the membrane extending between any adjacent crest portions the same length respectively. If there is a portion where the length of membrane is relatively short, there may be a recognized disadvantage that the fatigue resisting property is degraded because the portion is subject to a significant stress. Provided that the length of membrane in the vicinity of the crest portion of the smallest diameter located adjacent the second cylindrical portion is excluded since the amount of deformation is quite small around this portion.

In the boot for a constant velocity of the present invention, the depth of the second root portion (h) and the depth of the third root portion (H) satisfy the relational expression:

$$H/1.3 \leq h \leq H/1.1$$

By defining the depth of the second root portion that is most vulnerable to a jam when being deformed within the range shown above, a jam of the second root portion may be prevented even when the angle defined by a pair of axes of rotation is increased to about 50 degrees. For example, in the case where h=H/1.2 is satisfied, a jam at the second root portion can be prevented even when the angle defined by a pair of axes of rotation is increased up to about 52 degrees. In the case where the depth of the second root portion (h) is below H/1.3, it will be difficult to ensure a sufficient amount of deformation because the length of membrane of the second root portion is too short, and thus leading to degradation of the fatigue resisting property thereof. When the depth (h) of the second root portion is over H/1.1, a jam may occur at the second root portion.

The length of the membrane from the first crest portion through the second root portion to the second crest portion is almost the same as that from the second crest portion through the third root portion to the third crest portion. However, since the depth h of the second root portion is smaller than the depth H of the third root portion, as a next logical step, the angle at the second root portion is larger than that at the third root portion.

Since preventing a jam at the second root portion prevents a jam at the third root portion and thereafter from occurring, the constant velocity joint boot of the present invention does not suffer from a jam even when the angle defined by a pair of axes of rotation is significantly large such as 50 degrees or so, and thus degradation of sealing property caused by damage thereof is prevented with reliability. Therefore, the boot may have long lasting qualities.

As regards the structure other than those described above, the constant velocity joint boot of the present invention may have the same structure as conventional boot. As a material thereof, thermoplastic elastomer or the like which may be formed generally by blow molding may be employed. The number of the crest portions and the root portions and the thickness thereof may be selected according to the application.

Features and advantages of the invention will be evident from the following detailed description of the preferred embodiments described in conjunction with the attached drawings.

DETAILED DESCRIPTION OF THE PREFERRED EMBODIMENTS

Hereinafter, the present invention will be described specifically according to the preferred embodiment and comparative examples.

Embodiment

Figure 1:
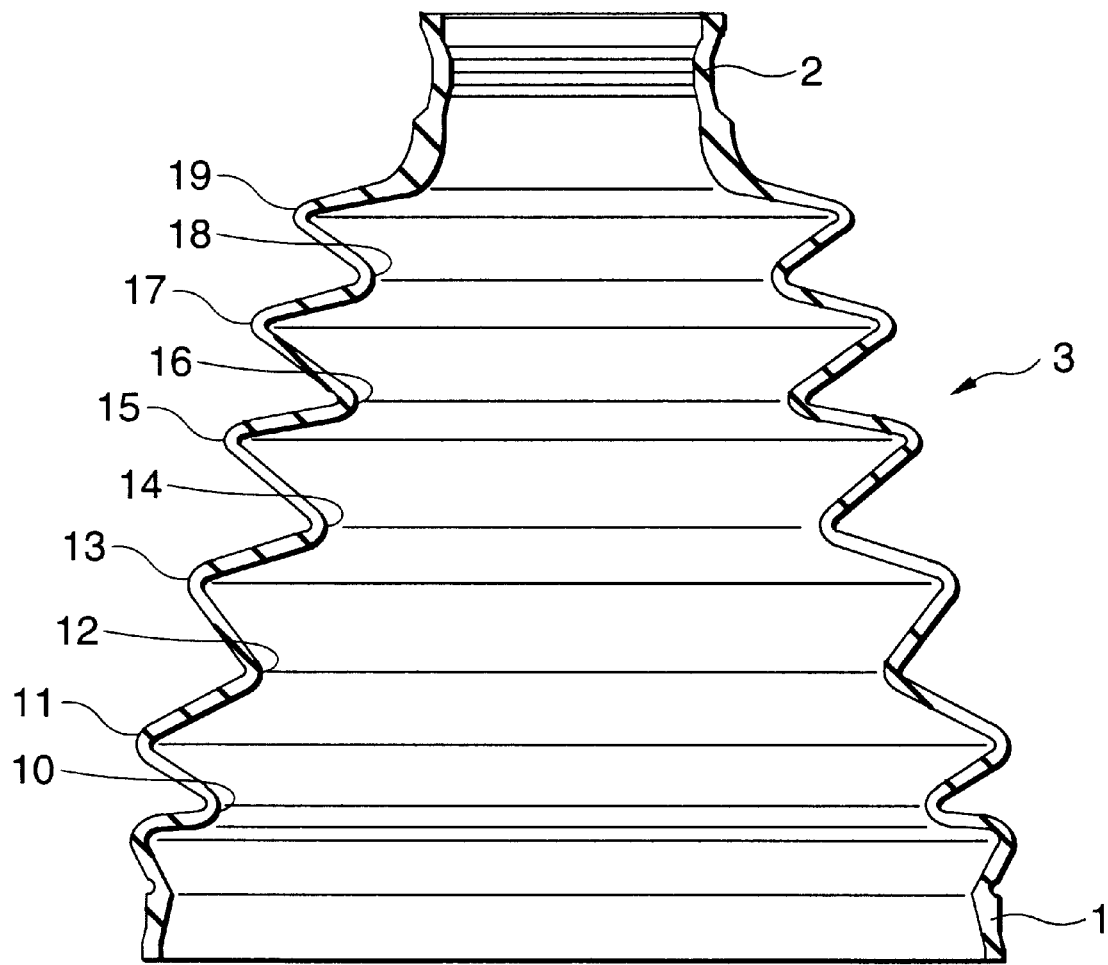
FIG. 1 is a cross sectional view of a constant velocity joint boot according to an embodiment of the present invention.
Figure 2:
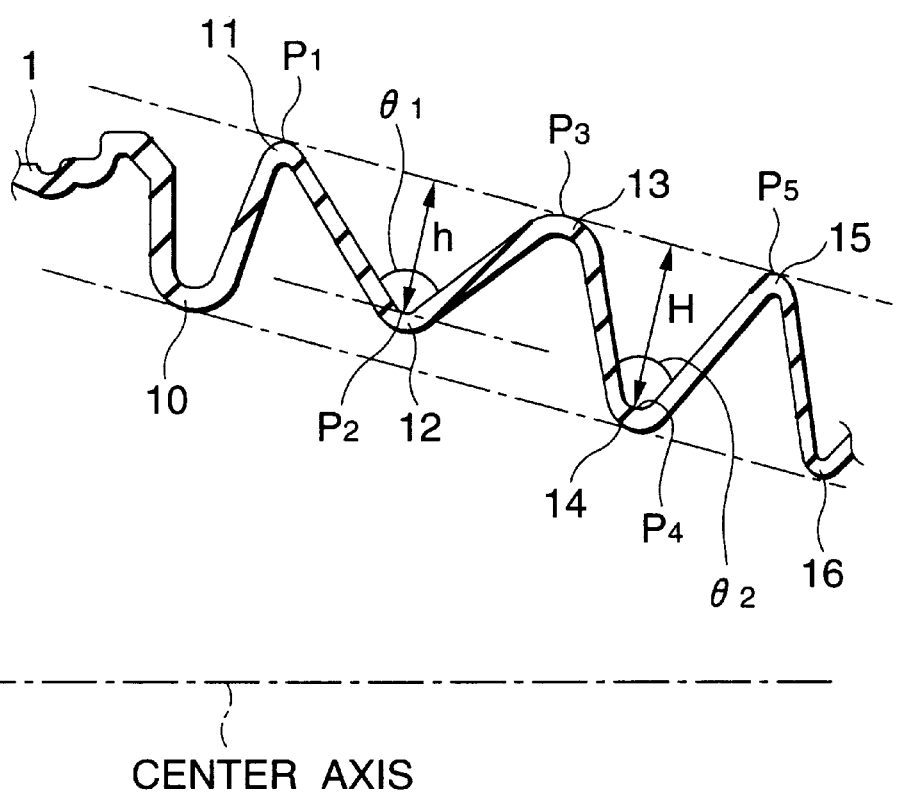
FIG. 2 is an enlarged cross sectional view of a principal portion of a constant velocity joint boot according to an embodiment of the present invention.

FIG. 1 is a cross sectional view of a constant velocity joint boot according to the present embodiment, and FIG. 2 is an enlarged view of the principal portion of the constant velocity joint boot of FIG. 1. The constant velocity joint boot comprises a first cylindrical portion 1, the second cylindrical portion 2 having smaller diameter than the first cylindrical portion 1, and the bellowed portion 3 in the shape of a generally truncated triangular pyramid for integrally connecting the first cylindrical portion 1 and the second cylindrical portion 2. The first cylindrical portion 1 and the bellowed portion 3 are formed of thermoplastic elastomer by blow molding, and the second cylindrical portion 2 is formed of thermoplastic elastomer integrally with the bellowed portion by injection molding.

The bellowed portion 3 comprises, from the side of the first cylindrical portion, a first root portion 10, a first crest portion 11, a second root portion 12, a second crest portion 13, a third root portion 14, a third crest portion 15, a fourth root portion 16, a fourth crest portion 17, a fifth root portion 18, and a fifth crest portion 19. The crest portions and the root portions are formed alternately, and the line connecting the tops of respective crest portions is a straight line so that the bellowed portion has a shape of a generally truncated triangular pyramid formed in such a manner that a first crest portion 11 has a largest diameter and the fifth crest portion 19 has a smallest diameter.

The outer diameter of the first crest portion 11 is the same as the largest outer diameter of the first cylindrical portion 1. In the cross section taken through a plane including the central axis, the length of the line (P1-P2-P3) connecting the top of the first crest portion 11 (P1) through the bottom of the second root portion 12 (P2) to the top of the second crest portion 13 (P3) is the same as that of the line (P3-P4-P5) connecting the top of the second crest portion 13 (P3) through the bottom of the third root portion 14 (P4) to the top of the third crest portion 15 (P5). In other words, the length of the membrane extending from the first crest portion 11 through the second root portion 12 to the second crest portion 13 is the same as the length of the membrane extending from the second crest portion 13 through the third root portion 15 to the third crest portion 15. The bellowed portion is so designed that the length of the membrane from any crest portion to an adjacent crest portion and the length of the next portion corresponding thereto are almost the same, except for the length of membrane from the fourth crest portion 17 through the fifth root portion 18 to the fifth crest portion 19.

The depth of the second root portion 12 (h) and the depth (H) of the third root portion 14 satisfy the relational expression h=H/1.2, and the angle $\theta_1$ of the second root portion 12 is substantially 90 degrees, which is larger than the angle of the first root portion 10 and the angle $\theta_2$ of the third root portion 14.

COMPARATIVE EXAMPLE 1

The configuration of the second root portion 12 is h=H/1.0, which is the same as the preferred embodiment. In this case, however, the angle $\theta_1$ of the second root portion 12 is substantially 70 degrees, which is the same angle as that of the third root portion 14 adjacent thereto.

COMPARATIVE EXAMPLE 2

This is the same as the preferred embodiment except for the configuration of the second root portion 12, which is h=H/1.4. In this case, the angle $\theta_1$ of the second root portion 12 is substantially 110 degrees, which is larger than that of the preferred embodiment.

EVALUATION

In constant velocity joint boots of the preferred embodiment and respective comparative examples, the first cylindrical portion 1 is fixed to the outer peripheral surface of the joint outer race 100 by a snap ring which is not shown, and the second cylindrical portion 2 is fixed to the outer peripheral surface of the drive shaft 101 by a snap ring which is not shown.

Figure 3:
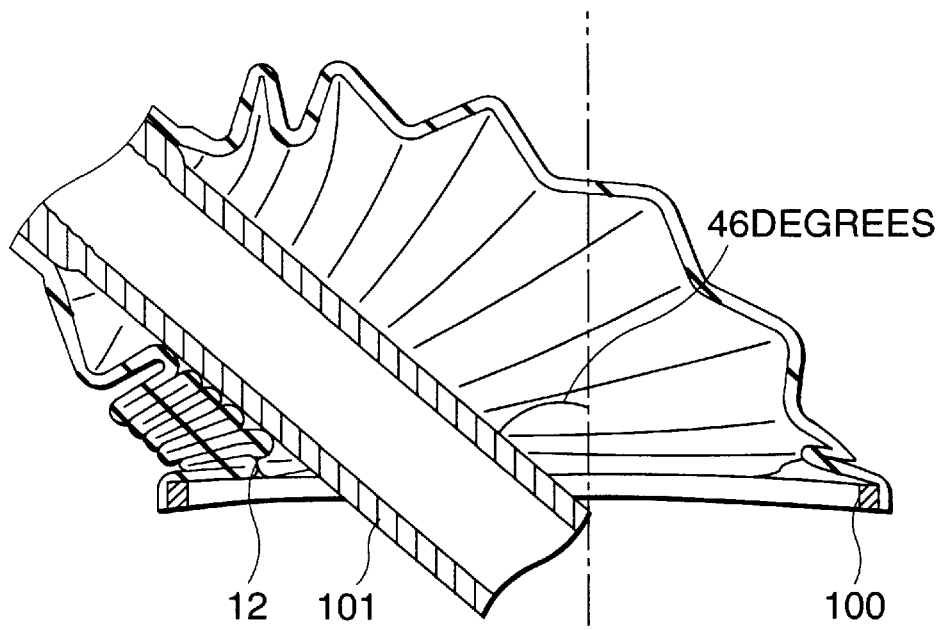
FIG. 3 is a cross sectional view of a constant velocity joint boot according to an embodiment of the present invention when in use.
Figure 4:
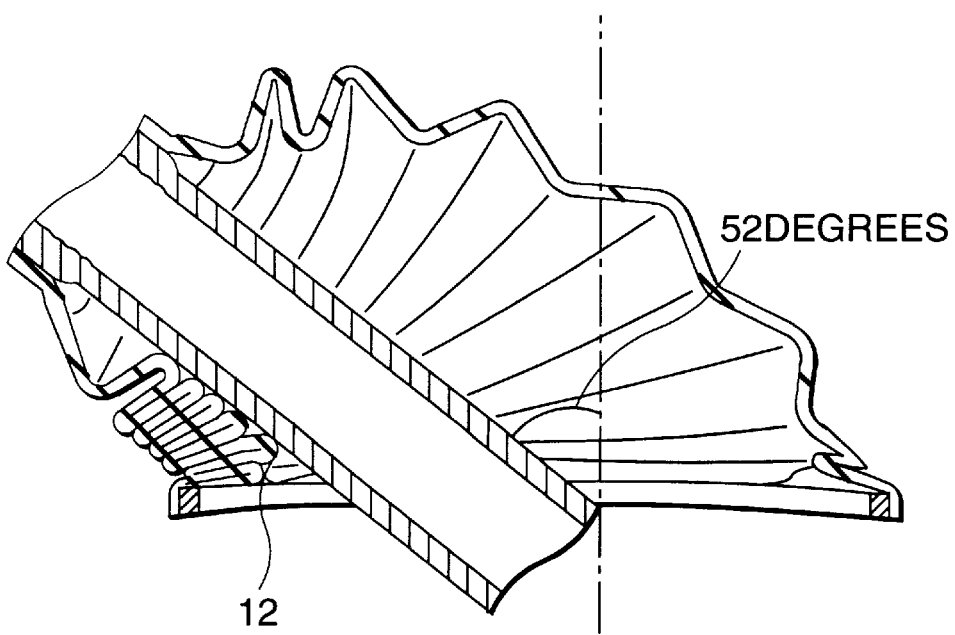
FIG. 4 is a cross sectional view of a constant velocity joint boot according to an embodiment of the present invention when in use.

In the constant velocity joint boot of the preferred embodiment, even when the angle defined by the central axis of the joint outer race 100 and the central axis of the drive shaft 101 is 46 degrees as shown in FIG. 3, or 52 degrees as shown in FIG. 4, a jam did not occur at the second root portion 12.

Figure 5:
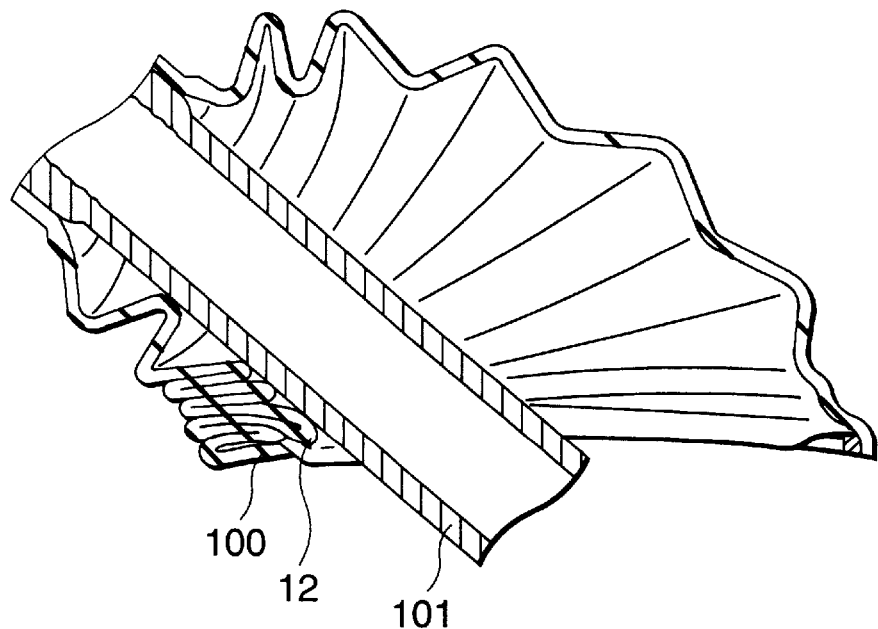
FIG. 5 is a cross sectional view of a constant velocity joint boot of Comparative Example 1.

On the other hand, in the case of the constant velocity joint boot of Comparative Example 1, when the angle defined by the central axis of the joint outer race 100 and the central axis of the drive shaft 101 is 46 degrees, the second root portion 12 is jammed between the joint outer race 100 and the drive shaft as shown in FIG. 5.

Figure 6:
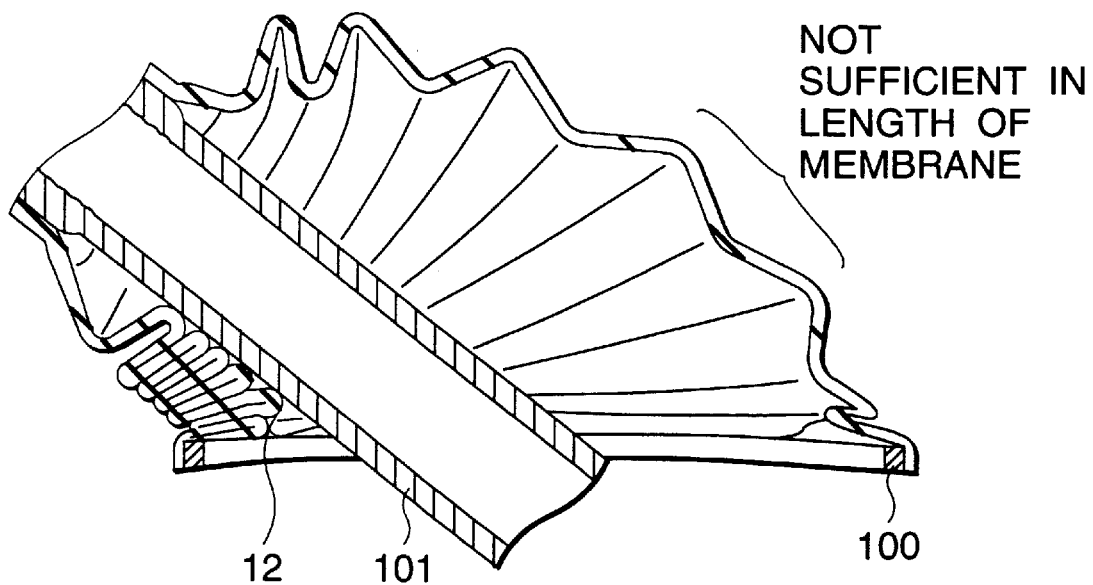
FIG. 6 is a cross sectional view of a constant velocity joint boot of Comparative Example 2.

In the constant velocity joint boot of Comparative Example 2, as shown in FIG. 6, a jam did not occur even when the angle defined by the central axis of the outer race 100 and the central axis of the drive shaft 101 is large. However, since the length of the membrane extending from the first crest portion 11 through the second root portion 12 to the second crest portion 13 is relatively short, the stress due to deformation is increased and thus the fatigue resisting property is degraded.

Based upon above described result, a variety of constant velocity joint boots, which are the same as the preferred embodiment except for the value of h, were manufactured and evaluated whether a jam occurred or not. As a result, in the case where $h \leq H/1.1$ a jam did not occur even when the angle defined by the central axis of the joint outer 100 and the central axis of the drive shaft 101 was 50 degrees. Therefore, when the relational expression $H/1.3 \leq h \leq H/1.1$ is satisfied, both of the fatigue resisting property as satisfied.

As is appreciated from the description above, in the constant velocity joint boot of the present invention, a jam of the root portions may be reliably prevented with the fatigue resisting property thereof maintained as it was conventionally, and with its dimensions reduced, and therefore long lasting qualities may be achieved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A constant velocity joint boot, comprising:
   a first cylindrical portion;
   a second cylindrical portion being spaced from and coaxial to said first cylindrical portion and having a smaller diameter than said first cylindrical portion; and
   a bellowed portion having a shape of generally truncated triangular pyramid for integrally connecting said first cylindrical portion to said second cylindrical portion,
   wherein said bellowed portion comprises a plurality of crests and roots arranged in such a manner as, from a side of said first cylindrical portion, a first root portion, a first crest portion, a second root portion, a second crest portion, a third root portion, a third crest portion continuously and alternately,
   wherein an outer diameter of said first crest portion is almost the same as that of said first cylindrical portion,
   wherein, in a cross section taken through a plane including a center axis, a length of a line connecting a top of said first crest portion through said second root portion to a top of said second crest portion is the same within manufacturing tolerances as that of a line connecting the top of said second crest portion through said third root portion to a top of said third crest portion, and
   wherein a depth of said second root portion h and a depth of said third root portion H satisfy a relational expression: $H/1.3 \leq h \leq H/1.1$.

2. A constant velocity joint boot according to claim 1, wherein the depth of said second root portion h and the depth of said third root portion H satisfy the relational expression: h=H/1.2.

3. A constant velocity joint boot according to claim 1, wherein a line connecting tops of respective crest portions is a straight line.

4. A constant velocity joint boot according to claim 1, wherein an angle of said second root portion is larger than an angle of said third root portion.

5. A constant velocity joint boot according to claim 1, wherein said constant velocity joint boot comprises thermoplastic elastomer.

6. A constant velocity joint boot according to claim 1, wherein the first cylindrical portion and the bellowed portion are formed by blow molding and the second cylindrical portion is formed integrally with the bellowed portion by injection molding.

7. A constant velocity joint boot according to claim 1, wherein a diameter of each crest portion is not larger than a diameter of the first cylindrical portion.

* * * * *